US008691722B2

(12) United States Patent
Gadkaree et al.

(10) Patent No.: US 8,691,722 B2
(45) Date of Patent: Apr. 8, 2014

(54) SORBENT COMPRISING ACTIVATED CARBON PARTICLES, SULFUR AND METAL CATALYST

(75) Inventors: Kishor Purushottam Gadkaree, Big Flats, NY (US); Anbo Liu, Painted Post, NY (US)

(73) Assignee: Corning Incorporated, Corning, NY (US)

(*) Notice: Subject to any disclaimer, the term of this patent is extended or adjusted under 35 U.S.C. 154(b) by 1395 days.

(21) Appl. No.: 12/167,418

(22) Filed: Jul. 3, 2008

(65) Prior Publication Data

US 2010/0004119 A1 Jan. 7, 2010

(51) Int. Cl.
*B01J 20/20* (2006.01)

(52) U.S. Cl.
USPC .............................. 502/417; 502/423; 502/429

(58) Field of Classification Search
USPC .......................................... 502/417, 423, 429
See application file for complete search history.

(56) References Cited

U.S. PATENT DOCUMENTS

| | | | |
|---|---|---|---|
| 3,919,369 A | 11/1975 | Holden | |
| 4,000,236 A | 12/1976 | Redfarn et al. | |
| 4,305,827 A | 12/1981 | Sasaki | |
| 4,338,288 A | 7/1982 | Rollmann | |
| 4,482,641 A | 11/1984 | Wennerberg | |
| 4,491,609 A | 1/1985 | Degel et al. | |
| 4,500,327 A | 2/1985 | Nishino et al. | |
| 4,518,704 A | 5/1985 | Okabayashi et al. | |
| 4,656,153 A | 4/1987 | Wennerberg | |
| 4,701,212 A | 10/1987 | Yan | |
| 4,814,152 A | 3/1989 | Yan | |
| 4,831,003 A | 5/1989 | Lang et al. | |
| 4,970,189 A | 11/1990 | Tachibana | |
| 4,999,330 A | 3/1991 | Bose et al. | |
| 5,043,310 A | 8/1991 | Takeuchi et al. | |
| 5,245,106 A | 9/1993 | Cameron et al. | |
| 5,278,123 A | 1/1994 | Chopin et al. | |
| 5,288,306 A | 2/1994 | Aibe et al. | |
| 5,306,675 A | 4/1994 | Wu et al. | |
| 5,350,728 A | 9/1994 | Cameron et al. | |
| 5,356,852 A | 10/1994 | DeLiso et al. | |
| 5,376,609 A | 12/1994 | Guile | |
| 5,389,325 A | 2/1995 | Bookbinder et al. | |
| 5,403,548 A | 4/1995 | Aibe et al. | |
| 5,421,860 A | 6/1995 | Bretz et al. | |
| 5,451,554 A | 9/1995 | Guile et al. | |
| 5,488,021 A | 1/1996 | DeLiso et al. | |
| 5,538,929 A * | 7/1996 | Sudhakar et al. ............. | 502/180 |
| 5,543,096 A | 8/1996 | Wu | |
| 5,601,701 A | 2/1997 | Cameron et al. | |
| 5,685,986 A | 11/1997 | Yamada et al. | |
| 5,716,899 A * | 2/1998 | Guile et al. .................. | 502/439 |
| 5,750,026 A | 5/1998 | Gadkaree et al. | |
| 5,914,294 A | 6/1999 | Park et al. | |
| 5,997,829 A * | 12/1999 | Sekine et al. ................. | 423/210 |
| 6,103,205 A | 8/2000 | Wojtowicz et al. | |
| 6,136,749 A | 10/2000 | Gadkaree et al. | |
| 6,149,820 A | 11/2000 | Pedersen | |
| 6,171,373 B1 | 1/2001 | Park et al. | |
| 6,187,713 B1 | 2/2001 | Gadkaree | |
| 6,258,334 B1 | 7/2001 | Gadkaree et al. | |
| 6,284,705 B1 | 9/2001 | Park et al. | |
| 6,372,289 B1 | 4/2002 | Hickman | |
| 6,472,343 B1 | 10/2002 | McCrae et al. | |
| 6,573,212 B2 | 6/2003 | McCrae et al. | |
| 6,682,667 B1 | 1/2004 | Matviya | |
| 6,696,384 B2 | 2/2004 | McCrae et al. | |
| 6,719,828 B1 | 4/2004 | Lovell et al. | |
| 6,787,494 B2 | 9/2004 | Tsuji et al. | |
| 6,790,390 B2 | 9/2004 | Py et al. | |
| 6,914,034 B2 | 7/2005 | Vo | |
| 7,017,757 B2 | 3/2006 | Wolff et al. | |
| 7,250,387 B2 | 7/2007 | Durante et al. | |
| 7,288,499 B1 | 10/2007 | Lovell et al. | |
| 7,370,657 B2 | 5/2008 | Zhuang et al. | |
| 2003/0075484 A1 | 4/2003 | Sakai et al. | |
| 2004/0074391 A1 | 4/2004 | Durante et al. | |
| 2005/0059549 A1 | 3/2005 | Vo | |
| 2005/0066817 A1 | 3/2005 | Wolff | |
| 2005/0093189 A1 | 5/2005 | Vo | |
| 2005/0100699 A1 | 5/2005 | Durante et al. | |
| 2005/0150835 A1 | 7/2005 | Vo | |
| 2005/0152821 A1 | 7/2005 | Durante et al. | |
| 2005/0155934 A1 | 7/2005 | Vo et al. | |
| 2005/0247635 A1 | 11/2005 | Vo et al. | |
| 2006/0045829 A1 | 3/2006 | Dodwell et al. | |
| 2006/0048646 A1 | 3/2006 | Olson et al. | |
| 2006/0051270 A1 | 3/2006 | Brunette | |
| 2006/0116287 A1 | 6/2006 | Durante et al. | |
| 2006/0142154 A1 | 6/2006 | Wolff | |
| 2006/0183812 A1 | 8/2006 | Miller et al. | |
| 2006/0205592 A1 | 9/2006 | Chao et al. | |
| 2006/0229476 A1 | 10/2006 | Mitchell, Sr. et al. | |
| 2006/0247121 A1 | 11/2006 | Shim | |
| 2007/0092418 A1 | 4/2007 | Mauldin et al. | |
| 2007/0104631 A1 | 5/2007 | Durante et al. | |
| 2007/0160517 A1 | 7/2007 | Fan et al. | |
| 2007/0179056 A1 | 8/2007 | Baek et al. | |
| 2007/0232488 A1 | 10/2007 | Akiyama et al. | |
| 2007/0261557 A1 | 11/2007 | Gadkaree et al. | |
| 2007/0265161 A1 | 11/2007 | Gadkaree et al. | |
| 2007/0292328 A1 | 12/2007 | Yang et al. | |
| 2008/0132408 A1 | 6/2008 | Mitchell et al. | |

FOREIGN PATENT DOCUMENTS

| | | |
|---|---|---|
| DE | 199 39 382 | 4/2001 |
| DE | 103 33 824 | 7/2004 |
| EP | 0487370 B1 | 5/1992 |
| JP | 55167118 A | 12/1980 |
| JP | 57095816 A | 6/1982 |
| JP | 58064133 A | 4/1983 |
| JP | 59227704 A | 12/1984 |
| JP | 60204610 A | 10/1985 |
| JP | 60225639 A | 11/1985 |
| JP | 62052116 A | 3/1987 |
| JP | 1009867 A | 1/1989 |
| JP | 5146678 A | 6/1993 |
| JP | 11147707 A | 6/1999 |
| JP | 2000-218164 | 8/2000 |
| JP | 2001-079346 | 3/2001 |
| JP | 2001240405 A | 9/2001 |
| JP | 2004-269821 | 9/2004 |
| JP | 2005-306710 | 11/2005 |
| JP | 2007117863 A | 5/2007 |
| WO | 2005/061099 A1 | 7/2005 |
| WO | 2007/114849 A2 | 10/2007 |
| WO | 2007127652 A2 | 11/2007 |
| WO | 2008/143831 | 11/2008 |

\* cited by examiner

*Primary Examiner* — Stuart Hendrickson
(74) *Attorney, Agent, or Firm* — Joseph M. Homa

(57) ABSTRACT

Sorbents comprising activated carbon particles, sulfur, and metal catalyst. The sorbents may be used, for example, for the removal of a contaminant, such as mercury, from a fluid stream.

22 Claims, 1 Drawing Sheet

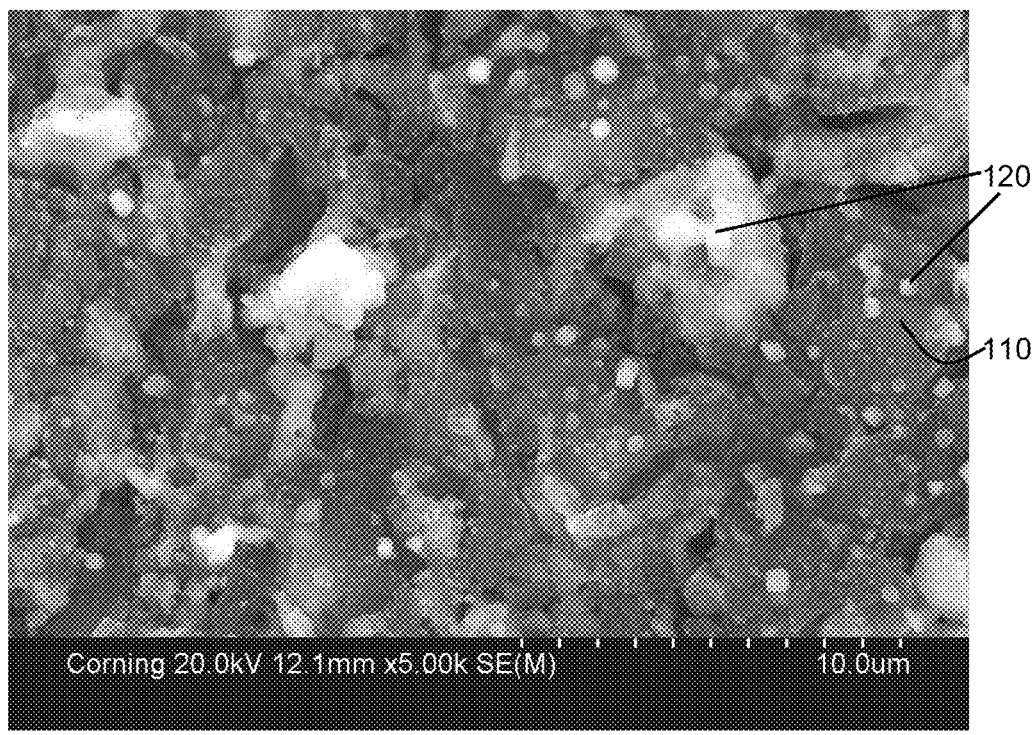

SORBENT COMPRISING ACTIVATED CARBON PARTICLES, SULFUR AND METAL CATALYST

FIELD OF THE DISCLOSURE

This disclosure relates to sorbents comprising activated carbon particles, sulfur, and metal catalyst. The sorbents may be used, for example, for the removal of a contaminant, such as mercury, from a fluid stream.

BACKGROUND

Hazardous contaminant emissions have become environmental issues of increasing concern because of the potential dangers posed to human health. For instance, coal-fired power plants and medical waste incineration are major sources of human activity related mercury emission into the atmosphere.

It is estimated that there are 48 tons of mercury emitted from coal-fired power plants in the United States annually. One DOE-Energy Information Administration annual energy outlook projected that coal consumption for electricity generation will increase from 976 million tons in 2002 to 1,477 million tons in 2025 as the utilization of coal-fired generation capacity increases. However, mercury emission control regulations have not been rigorously enforced for coal-fired power plants. A major reason is a lack of effective control technologies available at a reasonable cost, especially for elemental mercury control.

A technology currently in use for controlling emissions of elemental mercury as well as oxidized mercury is activated carbon injection (ACI). The ACI process involves injecting activated carbon powder into a flue gas stream and using a fabric filter or electrostatic precipitator to collect the activated carbon powder that has sorbed mercury. ACI technologies generally require a high C:Hg ratio to achieve the desired mercury removal level (>90%), which results in a high portion cost for sorbent material. The high C:Hg ratio indicates that ACI does not utilize the mercury sorption capacity of carbon powder efficiently.

The inventors have now discovered new sorbents for the removal of contaminants such as mercury from fluids.

BRIEF DESCRIPTION OF THE DRAWING

FIG. 1 is an SEM image of a sorbent according to one embodiment.

DESCRIPTION OF EMBODIMENTS

One embodiment of the invention is a sorbent comprising:
activated carbon particles bound together by a discontinuous binder;
sulfur, in any oxidation state, as elemental sulfur or in a chemical compound or moiety comprising sulfur; and
a metal catalyst, in any oxidation state, as elemental metal or in a chemical compound or moiety comprising the metal.

The activated carbon particles may be, for example, activated carbon powder, granular activated carbon, or a combination thereof. Exemplary activated carbon particles include those having a median size of from 1 to 100 microns.

The sulfur may include sulfur at any oxidation state, including elemental sulfur (0), sulfate (+6), sulfite (+4), and sulfide (−2). The term sulfur thus includes elemental sulfur or sulfur present in a chemical compound or moiety. The amount of sulfur present in the sorbent can be selected depending on the particular metal catalyst also present, application for which the sorbent is used, and the desired contaminant removing capacity and efficiency of the sorbent. In some embodiments, the sorbent comprises from 1% to 20% by weight of sulfur, or from 1% to 15%, from 3% to 8%, from 2% to 10%, from 0.1 to 5%, or from 2 to 5% by weight of sulfur. The weight percent of sulfur is calculated on the basis of elemental sulfur, with any sulfur in other states converted to elemental state for the purpose of calculating the total amount of sulfur in the sorbent.

The metal catalyst includes any metal element in any oxidation state, as elemental metal or in a chemical compound or moiety comprising the metal, which is in a form that promotes the removal of a contaminant (such as cadmium, mercury, chromium, lead, barium, beryllium, nickel, cobalt, vanadium, zinc, copper, manganese, antimony, silver, thallium, arsenic or selenium) from a fluid in contact with the sorbent. Metal elements can include alkali metals, alkaline earth metals, transition metals, rare earth metals (including lanthanoids), and other metals such as aluminum, gallium, indium, tin, lead, thallium and bismuth.

As mentioned above, the metal catalysts can exist at any valency. For example, if iron is present, it may be present at +3, +2 or 0 valencies or as mixtures of differing valencies, and can be present as metallic iron (0), or in FeO, $Fe_2O_3$, $Fe_3O_8$, FeS, $FeCl_2$, $FeCl_3$, $FeSO_4$, and the like. As another example, if manganese is present, it may be present at +4, +2 or 0 valencies or as mixtures of differing valencies, and can be present as metallic manganese (0), or in MnO, $MnO_2$, MnS, $MnCl_2$, $MnCl_4$, $MnSO_4$, and the like.

In some embodiments of the invention, the metal catalyst is an alkali metal such as lithium, sodium, or potassium. In other embodiments, the metal catalyst is an alkaline earth metal such as magnesium, calcium, or barium. In other embodiments, the metal catalyst is a transition metal, such as palladium, platinum, silver, gold, manganese, or iron. In other embodiments, the metal catalyst is a rare earth metal such as cerium. In some embodiments, the metal catalyst is in elemental form. In other embodiments, the metal catalyst is present in a metal sulfide. In other embodiments, the metal catalyst is present in a transition metal sulfide or oxide. In yet other embodiments, the sorbent body comprises at least one catalyst other than an alkali metal, an alkaline earth metal, or transition metal, or other than a metal oxide. In other embodiments, the sorbent body comprises at least one catalyst other than sodium, other than potassium, other than magnesium, other than calcium, other than aluminum, other than titanium, other than zirconium, other than chromium, other than magnesium, other than iron and/or other than zinc. In other embodiments, the sorbent body comprises at least one metal catalyst other than aluminum, vanadium, iron, cobalt, nickel, copper, or zinc, either in elemental form or as sulfates.

The amount of the metal catalyst present in the sorbent can be selected depending on the particular metal catalyst used, application for which the sorbent is used, and the desired contaminant removing capacity and efficiency of the sorbent. In certain embodiments, the amount of the metal catalyst ranges from 1% to 25% by weight, from 1-20%, from 1-15%, from 2% to 18%, from 3-10%, from 3-5%, from 5% to 15%, or from 5% to 10% by weight of the sorbent.

The weight percent of metal catalyst is calculated on the basis of elemental metal, with any metal in other states converted to elemental state for the purpose of calculation of the total amount of metal catalyst in the relevant material. Metal elements present in an inert from, such as in an inorganic binder compound, are not considered metal catalysts and do not contribute to the weight percent of a metal catalyst. The amount of sulfur or metal catalyst may be determined using any appropriate analytical technique, such as mass spectroscopy and LECO analysis (for sulfur).

In some embodiments, the metal catalyst can function in one or more of the following ways to promote the removal of a contaminant from a fluid in contact with the sorbent: (i) temporary or permanent chemical sorption (e.g., via covalent and/or ionic bonds) of a contaminant; (ii) temporary or permanent physical sorption of a contaminant; (iii) catalyzing the reaction/sorption of a contaminant with other components of the sorbent body; (iv) catalyzing the reaction of a contaminant with the ambient atmosphere to convert it from one form to another for sorption; (v) trapping a contaminant already sorbed by other components of the sorbent body; and (vi) facilitating the transfer of a contaminant to the active sorbing sites.

In this and any other embodiments of sorbent bodies the invention, at least a portion of the sulfur, of the metal catalyst, or of both the sulfur and metal catalyst, is in a state capable of chemically bonding with cadmium, mercury, chromium, lead, barium, beryllium, nickel, cobalt, vanadium, zinc, copper, manganese, antimony, silver, thallium, arsenic or selenium. For instance, at least a portion of the sulfur can be in a state capable of chemically bonding with mercury.

In some embodiments, at least a portion of the metal catalyst is chemically bound to at least a portion of the sulfur. The term "at least a portion" in this and other contexts refers to some or all of the material being described. Thus, in these embodiments, some or all of the metal catalyst in the sorbent can be chemically bound to some or all of the sulfur in the sorbent. Further, in some embodiments, at least a portion of the sulfur is chemically bound to at least a portion of carbon in the activated carbon particles.

When a metal catalyst is chemically bound to sulfur, in some embodiments the sorbent comprises a metal sulfide. Exemplary metal sulfides include sulfides of manganese, copper, calcium, palladium, molybdenum, or tungsten, and combinations thereof. The metal element in the metal sulfide, however, is not limited to those examples. For example, the metal element in the metal sulfides may be selected from alkali metals, alkaline earth metals, transition metals, rare earth metals (including lanthanoids), and other metals such as aluminum, gallium, indium, tin, lead, thallium and bismuth.

In some embodiments where the sorbent comprises a metal bound to sulfur (such as a metal sulfide), or where the sorbent comprises sulfur bound to carbon, the sorbent further comprises additional sulfur such as elemental sulfur. In some further embodiments, at least a portion of sulfur is not bound to metal catalyst and/or at least a portion of metal catalyst is not bound to sulfur.

The sorbent of the embodiments described above further comprise a discontinuous binder providing a bond between the activated carbon particles. The term "discontinuous" refers to the binder serving to adhere or bind activated carbon particles without the binder itself being in the form of a supporting matrix for the activated carbon particles. The mechanical strength and durability of the sorbent is therefore attributable to the bound activated carbon particles rather than to a supporting binder matrix.

FIG. 1 is an SEM image of a sorbent according to one embodiment of the invention. The image illustrates activated carbon particles, such as activated carbon particle 110, and inorganic material, such as inorganic materials 120. The image shows that the sorbent does not contain a matrix of binder supporting the activated carbon particles, but instead any binder is in a discontinuous form, such as in particulate form.

In some embodiments, the total amount of binder present in the sorbent is an amount up to 30 wt %, up to 25 wt %, up to 20 wt %, up to 15 wt %, up to 10 wt %, or up to 5 wt %. In some embodiments, these wt % values represent the wt % of an organic binder. In other embodiments, these wt % values represent the wt % of an inorganic binder. In some embodiments, the sorbent of the invention comprises up to 30 wt % of inorganic binder. In other embodiments, the sorbent comprises up to 20 wt % of organic binder.

The binder may comprise an inorganic binder or an organic binder. The term "binder" includes one binder as well as combinations of two or more binders, each independently being an inorganic binder or inorganic binder. Thus, in some embodiments, the sorbent can comprise both an inorganic binder and an organic binder, or two or more inorganic binders or two or more organic binders.

Exemplary inorganic binders include certain oxides, sulfates, carbonates, and phosphates, such as certain oxides, sulfates, carbonates, and phosphates of metals or of semimetals such as silicon and germanium. For instance, talc, clay such as bentonite clay, and Plaster of Paris may be used as inorganic binders. In contrast to the metal catalyst, any metal element in the inorganic binder material is chemically and physically inert, meaning that it does not catalyze the sorption of contaminants onto sorbents of the invention.

The sorbents may also comprise organic binders. The term "organic binder" includes not only organic compounds but also the carbon remnants of such compounds if they have been carbonized by exposure to carbonization conditions such as a high temperature. Thus, reference to a particular material as an "organic binder" includes that material as well as the carbonized remnants of such a material. One embodiment, however includes organic binder that has not been carbonized, while another embodiment includes organic binder that has been carbonized.

Exemplary organic binders include organic resins. Organic resins include thermosetting resins and thermoplastic resins (e.g., polyvinylidene chloride, polyvinyl chloride, polyvinyl alcohol, and the like). Synthetic polymeric material may be used, such as phenolic resins or a furfural alcohol based resin such as furan resins. Exemplary suitable phenolic resins are resole resin such as plyophen resin. An exemplary suitable furan liquid resin is Furcab-LP from QO Chemicals Inc., Ind., U.S.A. An exemplary solid resin is solid phenolic resin or novolak. Any organic resin binder may be uncured, cured, or carbonized in the sorbents of the invention.

In some embodiments, the sorbent does not comprise a ceramic binder. In other embodiments, the sorbent does not comprise carbon or activated carbon binder.

The sorbent may comprise cellulose compounds. Cellulose compounds include cellulose ethers, such as methylcellulose, ethylhydroxy ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. An example methylcellulose binder is METHOCEL A, sold by the Dow Chemical Company. Example hydroxypropyl methylcellulose binders include METHOCEL E, F, J, K, also sold by the Dow Chemical Company. Binders in the METHCEL 310 Series, also sold by the Dow Chemical Company, can also be used in the context of the invention. METHOCEL A4M is an example binder for use with a RAM extruder. METHOCEL F240C is an example binder for use with a twin screw extruder.

Another embodiment of the invention is a sorbent comprising:
  activated carbon particles bound together by a binder;
  sulfur, in any oxidation state, as elemental sulfur or in a chemical compound or moiety comprising sulfur; and
  a metal catalyst, in any oxidation state, as elemental metal or in a chemical compound or moiety comprising the metal;
  wherein at least a portion of sulfur is not bound to metal catalyst and/or at least a portion of metal catalyst is not bound to sulfur.

The binder in this instance may or may not be of a discontinuous form. The activated carbon, sulfur, metal catalyst and binder may be selected from those materials described previously. The extent of any binding between sulfur and metal catalyst may be controlled by selection of appropriate relative amounts of sulfur and metal catalyst used to make the sorbent as well as selection of processing conditions for making the sorbent.

Still a further embodiment of the invention is a sorbent comprising:
  activated carbon particles bound together by a binder;
  sulfur, in any oxidation state, as elemental sulfur or in a chemical compound or moiety comprising sulfur; and
  a metal catalyst, in any oxidation state, as elemental metal or in a chemical compound or moiety comprising the metal;
  wherein at least a portion of the sulfur and/or at least a portion of the metal catalyst is distributed homogenously throughout the bodies of at least a portion of the activated carbon particles.

The binder in this instance may or may not be of a discontinuous form. The activated carbon, sulfur, metal catalyst and binder may be selected from those materials described previously. The distribution of sulfur and/or metal catalyst within the activated carbon particle bodies may be controlled by, for example, homogenous in-situ incorporation of sulfur and/or metal catalyst in precursor material used to form the activated carbon particles.

The sorbents of any embodiments discussed above may be in any appropriate physical form. In one embodiment, the sorbent is in the form of a granule, pellet, or planar or tubular structure. In some embodiments, the sorbent is in the form of a monolith. In a further embodiment, the sorbent is in the form of a flow-through sorbent body, such as in the form of a honeycomb. Exemplary flow-through sorbents include, for example, any structure comprising channels, porous networks, or any other passages that would permit the flow of a fluid stream through the sorbent. For instance, the flow-through sorbent may be a monolith or an arrangement of interconnected structures creating openings through which a fluid steam may pass. The flow-through sorbent may be a honeycomb sorbent comprising an inlet end, an outlet end, and a multiplicity of cells extending from the inlet end to the outlet end, the cells being defined by intersecting porous cell walls. A honeycomb sorbent could optionally comprise one or more selectively plugged honeycomb cell ends to provide a wall flow-through structure that allows for more intimate contact between a fluid stream and cell walls.

The cell density of a honeycomb can be adjusted during an extrusion process to achieve desired physical attributes. The cell density of the honeycomb can range from 25 to 500 cells·inch$^{-2}$ (3.88 to 77.5 cells·cm$^{-2}$) in certain embodiments, from 50 to 200 cells·inch$^{-2}$ (7.75 to 31.0 cells·cm$^{-2}$) in certain other embodiments, and from 50 to 100 cells·inch$^{+2}$ (7.75 to 15.5 cells·cm$^{-2}$) in certain other embodiments. In certain embodiments, the thickness of the cell walls ranges from 1 mil to 50 mil, for example from 10 mil to 30 mil.

In yet a further embodiment, the sorbent is provided as a coating on an inorganic substrate. Exemplary inorganic substrates include glass, glass-ceramic, ceramic, and metal substrates. Some example substrate materials include cordierite, mullite, clay, magnesia, metal oxides, talc, zircon, zirconia, zirconates, zirconia-spinel, magnesium alumino-silicates, spinel, alumina, silica, silicates, borides, alumino-silicates, e.g., porcelains, lithium aluminosilicates, alumina silica, feldspar, titania, fused silica, nitrides, borides, carbides, e.g., silicon carbide, silicon nitride or combinations of these.

The inorganic substrates, which may be porous, may comprise one or more coatings of inorganic material, which may also be porous. Coatings of inorganic material may be provided as washcoats of inorganic material. Exemplary inorganic coating materials include cordierite, alumina (such as alpha-alumina and gamma-alumina), mullite, aluminum titanate, titania, zirconia, and ceria particles and combinations thereof.

The inorganic substrate may itself be, for example, be in the form of a flow-through structure, such as a honeycomb. Exemplary flow-through structures include, for example, any structure comprising channels, porous networks, or any other passages that would permit the flow of a fluid stream through the structure. The inorganic substrate may also be in the form of, for example, granules, pellets, or planar or tubular structures.

A coating of the sorbent may coat all or a portion of the surface of the inorganic substrate, and may impregnate the substrate to some extent if the surface of the substrate is porous. For instance, the coating may coat the inner channel surfaces of an inorganic honeycomb substrate and any outer surfaces of the honeycomb.

Sorbents of the invention may be formed by any suitable technique. In one embodiment, a sorbent body may be made by a first process that comprises:
  providing a mixture comprising:
  activated carbon particles,
    sulfur, in any oxidation state, as elemental sulfur or in a chemical compound or moiety comprising sulfur,
    a metal catalyst, in any oxidation state, as elemental metal or in a chemical compound or moiety comprising the metal, and
    a binder; and
  forming the mixture into the shape of a sorbent body.

The activated carbon, sulfur, metal catalyst and binder may be selected from the materials discussed above in the context of the sorbents of the invention. For instance, the metal catalyst may be in a form selected from: (i) halides and oxides of alkali and alkaline earth metals; (ii) precious metals and compounds thereof; (iii) oxides, sulfides, and salts of vanadium, chromium, manganese, iron, cobalt, nickel, copper, zinc, niobium, molybdenum, silver, tungsten and lanthanoids; or (iv) combinations and mixtures of two or more of (i), (ii) and (iii). According to certain embodiments of the process, the metal catalyst may be in a form selected from: (i) oxides, sulfides, sulfates, acetates and salts of manganese; (ii) oxides, sulfides and salts of iron; (iii) combinations of (i) and KI; (iv) combinations of (ii) and KI; and/or (v) mixtures and combinations of any two or more of (i), (ii), (iii) and (iv).

The sulfur may be in a form selected from, for example, sulfur powder, sulfur-containing powdered resin, sulfides, sulfates, and other sulfur-containing compounds, and mixtures or combination of any two or more of these. Exemplary sulfur-containing compounds include hydrogen sulfide and/or its salts, carbon disulfide, sulfur dioxide, thiophene, sulfur anhydride, sulfur halides, sulfuric ester, sulfurous acid, sulfacid, sulfatol, sulfamic acid, sulfan, sulfanes, sulfuric acid and its salts, sulfite, sulfoacid, sulfobenzide, and mixtures thereof.

In some embodiments, the binder comprises an organic resin. The organic resin may, for example, be cured after forming the mixture into the shape of a sorbent body. Curing can be performed, for example, in air at atmospheric pressure and typically by heating the structure at a temperature of from 70° C. to 200° C. for about 0.5 to about 5.0 hours. In certain embodiments, the body is heated from a low temperature to a higher temperature in stages, for example, from 70° C., to 90° C., to 125° C., to 150° C., each temperature being held for a period of time. Additionally, curing can also be accomplished by adding a curing additive such as an acid additive at room temperature.

The mixture can be formed into the shape of a sorbent body by any appropriate technique, such as by extrusion. Extrusion can be done by using standard extruders (ram extruder, single-screw, double-screw, and the like) and custom extrusion dies, to make sorbent bodies with various shapes and geometries, such as honeycombs, pellets, rods, spaghetti, and the like. Extrusion is particularly effective for making monolithic honeycomb bodies having a plurality of channels that can serve as fluid passageways.

Molds of various shapes and dimensions may also be used for shaping a sorbent of the invention through injection molding, compression molding and casting, all of which are well-known shaping techniques. Rapid prototyping, the automatic construction of physical objects using solid freeform fabrication, may also be used to shape the sorbent. One advantage of rapid prototyping is that it may be used to create virtually almost any shape or geometric feature. Rapid prototyping comprises obtaining a virtual design, for example a computer aided design, converting the design into virtual thin horizontal cross sections, then creating each cross section of the design in physical space, one after the next, until the shape is completed. One embodiment includes obtaining a virtual design of a shaped body, converting the design into virtual thin horizontal cross sections, and creating each cross section in physical space from the composition. One example of rapid prototyping is 3D printing.

The formed body may also be optionally dried and optionally fired as well. The body can be dried, for example, in an environment at 75-200° C. The body can be fired to impart greater mechanical integrity to the structure. Exemplary firing conditions include firing at 600° C. to 1500° C. for a period of from 0.5 to 10 hours in a controlled gas environment at a heating rate of, for example, 0.5-2° C./min. In another embodiment, the firing process can be executed for 20-45 hours at 1100-1300° C. in air or in a mixture of nitrogen and oxygen. In yet another embodiment, the structure may be heated to carbonize any organic binder, for example at a temperature of 600° C. or more, then fired at a higher temperature to achieve sintering of inorganic binder material, for instance.

A second technique for making a sorbent body includes a process that comprises:
  providing a first mixture comprising:
    a carbon source,
    sulfur, in any oxidation state, as elemental sulfur or in a chemical compound or moiety comprising sulfur,
    a metal catalyst, in any oxidation state, as elemental metal or in a chemical compound or moiety comprising the metal, and
  carbonizing the first mixture under conditions sufficient to carbonize the carbon source;
  activating the carbonized mixture;
  mixing the activated first mixture, in the form of particles, with a binder to form a second mixture; and
  forming the second mixture into the shape of a sorbent body.

In this embodiment, preparation of a homogenous mixture of the carbon source, sulfur and metal catalyst in the first mixture, followed by carbonization, can lead to sulfur and metal catalyst being distributed throughout the activated carbon particle bodies.

The activated carbon, sulfur, metal catalyst, and binder may be selected from the materials discussed above in the context of the sorbents of the invention and the first process for making a sorbent body discussed previously.

Exemplary carbon sources include synthetic carbon-containing polymeric material, organic resins, charcoal powder, coal tar pitch, petroleum pitch, wood flour, cellulose and derivatives thereof, natural organic materials such as wheat flour, wood flour, corn flour, nut-shell flour, starch, coke, coal, or mixtures or combinations of any two or more of these.

In one embodiment, the carbon source comprises an organic resin. Exemplary organic resins include thermosetting resins and thermoplastic resins (e.g., polyvinylidene chloride, polyvinyl chloride, polyvinyl alcohol, and the like). Synthetic polymeric material may be used, such as phenolic resins or a furfural alcohol based resin such as furan resins. Exemplary suitable phenolic resins are resole resins such as plyophen resins. An exemplary suitable furan liquid resin is Furcab-LP from QO Chemicals Inc., Ind., U.S.A. An exemplary solid resin is solid phenolic resin or novolak.

The carbon source, such as an organic resin, may optionally be cured before being subjected to carbonization. The first mixture may be carbonized, for instance, by subjecting it to an elevated carbonizing temperature in an $O_2$-depleted atmosphere. The carbonization temperature can range from 600 to 1200° C., in certain embodiments from 700 to 1000° C. The carbonizing atmosphere can be inert, comprising mainly a non reactive gas, such as $N_2$, Ne, Ar, mixtures thereof, and the like. At the carbonizing temperature in an $O_2$-depleted atmosphere, the organic substances contained in the batch mixture body decompose to leave a carbonaceous residue.

As can be expected, complex chemical reactions can take place in this high-temperature step. Such reactions can include, inter alia:
  (i) decomposition of carbon-source materials to leave a carbonaceous materials;
  (ii) decomposition of metal catalyst materials;
  (iii) decomposition of sulfur materials;
  (iv) reactions between the sulfur materials and the carbon or carbon-source materials;
  (v) reactions between the sulfur materials and metal catalyst materials; and
  (vi) reactions between the metal catalyst materials and carbon or carbon-source materials.

The first mixture is then activated. The carbonized mixture may be activated, for example, in a gaseous atmosphere selected from $CO_2$, $H_2O$, a mixture of $CO_2$ and $H_2O$, a mixture of $CO_2$ and nitrogen, a mixture of $H_2O$ and nitrogen, and a mixture of $CO_2$ and another inert gas, for example, at an elevated activating temperature in a $CO_2$ and/or $H_2O$-containing atmosphere. The atmosphere may be essentially pure $CO_2$ or $H_2O$ (steam), a mixture of $CO_2$ and $H_2O$, or a combination of $CO_2$ and/or $H_2O$ with an inert gas such as nitrogen and/or argon. Utilizing a combination of nitrogen and $CO_2$, for example, may result in cost savings. A $CO_2$ and nitrogen mixture may be used, for example, with $CO_2$ content as low as 2% or more. Typically a mixture of $CO_2$ and nitrogen with a $CO_2$ content of 5-50% may be used to reduce process costs. The activating temperature can range from 600° C. to 1000° C., in certain embodiments from 600° C. to 900° C. During this step, part of the carbonaceous structure of the carbonized batch mixture body is mildly oxidized:

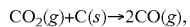

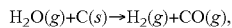

resulting in the etching of the structure of the carbonaceous body and formation of an activated carbon matrix that can define a plurality of pores on a nanoscale and microscale. The activating conditions (time, temperature and atmosphere) can be adjusted to produce the final product with the desired specific area.

If the activated first mixture is not in the form of particles, the mixture may be ground or otherwise processed to form particles. In some embodiments, the binder combined with the first mixture to make the second mixture is an organic resin. The organic resin may, for example, be cured after forming the mixture into the shape of a sorbent body. Curing can be performed, for example, according to the procedures outlined previously.

The second mixture can then be formed into the shape of a sorbent body by any appropriate technique, such as by extrusion. The formed body may also be dried and optionally fired as well under conditions detailed previously.

Sorbent bodies of the invention may be prepared by any other appropriate techniques. For instance, sorbents of the invention could be made by dip-coating or spraying bodies formed of bound activated carbon particles with appropriate solutions or suspensions of sulfur and/or catalyst metal.

The mixtures that are to be formed into sorbent bodies of the invention may be in the form of batch compositions that comprise:
    activated carbon particles;
    sulfur, in any oxidation state, as elemental sulfur or in a chemical compound or moiety comprising sulfur;
    a metal catalyst, in any oxidation state, as elemental metal or in a chemical compound or moiety comprising the metal;
    a binder; and
    water.

Such batch compositions may be in the form of, for example, a slurry or a paste.

The mixtures that are to be formed into sorbent bodies in either of the methods mentioned above may also optionally comprise forming aids. Exemplary forming aids include soaps, fatty acids, such as oleic, linoleic acid, sodium stearate, etc., polyoxyethylene stearate, etc. and combinations thereof. Other additives that can be useful for improving the extrusion and curing characteristics of the batch are phosphoric acid and oil. Exemplary oils include petroleum oils with molecular weights from about 250 to 1000, containing paraffinic and/or aromatic and/or alicyclic compounds. Some useful oils are 3 in 1 oil from 3M Co., or 3 in 1 household oil from Reckitt and Coleman Inc., Wayne, N.J. Other useful oils can include synthetic oils based on poly(alpha olefins), esters, polyalkylene glycols, polybutenes, silicones, polyphenyl ether, CTFE oils, and other commercially available oils. Vegetable oils such as sunflower oil, sesame oil, peanut oil, soyabean oil etc. are also useful.

Sorbent bodies comprising activated carbon particles, sulfur and metal catalyst may be useful for the sorption of contaminants from a fluid. Thus, a further embodiment of the invention is a method for removing a contaminant from a fluid, which comprises:
    providing a sorbent comprising:
    activated carbon particles;
    sulfur, in any oxidation state, as elemental sulfur or in a chemical compound or moiety comprising sulfur; and
    a metal catalyst, in any oxidation state, as elemental metal or in a chemical compound or moiety comprising the metal; and
    contacting the sorbent with a fluid comprising a contaminant;
wherein at least a portion of the contaminant is sorbed on the sorbent and thereby removed from the fluid.

Exemplary sorbents include any of those described previously as embodiments of sorbents of the present invention. For example, a fluid may be contacted with a sorbent body, such as passed through a sorbent such as a honeycomb, to remove a contaminant in the fluid. The fluid may be in the form of a gas or a liquid. The gas or liquid may also contain another phase, such as a solid particulate in either a gas or liquid stream, or droplets of liquid in a gas stream. Example gas streams include coal combustion flue gases (such as from bituminous and sub-bituminous coal types or lignite coal) and syngas streams produced in a coal gasification process.

The terms "sorb," "sorption," and "sorbed," refer to the adsorption, absorption, or other entrapment of the contaminant on the sorbent, either physically, chemically, or both physically and chemically.

Contaminants to be sorbed include, for instance, contaminants at 3 wt % or less within the fluid stream, for example at 2 wt % or less, or 1 wt % or less. Contaminants may also include, for instance, contaminants at 10,000 µg/m$^3$ or less within the fluid stream. Example contaminants include metals, including toxic metals. The term "metal" in this context and any reference to a particular metal or other contaminant by name in this context includes the elemental forms as well as oxidation states of the metal or other contaminant. Sorption of a metal or other named contaminant thus includes sorption of the elemental form of the metal or other contaminant as well as sorption of any organic or inorganic compound or composition comprising the metal or other contaminant.

Example metals that can be sorbed include cadmium, mercury, chromium, lead, barium, beryllium, and chemical compounds or compositions comprising those elements. In one embodiment, the metal is mercury in an elemental ($Hg^0$) or oxidized state ($Hg^+$ or $Hg^{2+}$). Example forms of oxidized mercury include HgO and halogenated mercury, for example $Hg_2Cl_2$ and $HgCl_2$. Other exemplary metallic contaminants include nickel, cobalt, vanadium, zinc, copper, manganese, antimony, silver, and thallium, as well as organic or inorganic compounds or compositions comprising them. Additional contaminants include arsenic and selenium as elements and in any oxidation states, including organic or inorganic compounds or compositions comprising arsenic or selenium.

The contaminant may be in any phase that can be sorbed on the sorbent bodies. Thus, the contaminant may be present, for example, as a liquid in a gas fluid steam, or as a liquid in a liquid fluid stream. The contaminant could alternatively be present as a gas phase contaminant in a gas or liquid fluid stream. In one embodiment, the contaminant is mercury vapor in a coal combustion flue gas or syngas stream.

The invention is further described with reference to the following non-limiting examples.

EXAMPLE 1

Activated carbon 51 wt %, sulfur powder 6 wt %, manganese dioxide powder 6 wt %, talc 30 wt %, methylcellulose 6 wt % and sodium stearate lubricant 1 wt % were mixed with water in a muller. The mixture was extruded into 100/17 honeycombs. The honeycombs were then fired to 1000° C. in nitrogen. Excellent quality honeycombs were obtained from this type of batch.

EXAMPLE 2

In this example, phenolic resin as an organic binder is used to form an extruded body. A composition containing 61 wt % activated carbon, 6 wt % sulfur powder, 6 wt % manganese dioxide powder, 6 wt % methocel, 1 wt % sodium stearate, 20 wt % phenolic resole resin were mixed with additional water and extruded into a honeycomb structure. These honeycomb was then dried and cured at 150° C. The honeycomb may be used as cured or may be fired to a higher temperature to attain higher strength.

EXAMPLE 3

A batch containing 47 wt % phenolic resole resin, 7 wt % $MnO_2$, 34 wt % charcoal, 10 wt % sulfur and 2 wt % oil was mixed dried and cured at 150° C. The batch was then ground to a powder (−200 mesh ~10 micron particle size). The powder was then carbonized in nitrogen at 900° C. and activated in $CO_2$ at 900° C. The activated carbon powder thus obtained was extruded with methocel 7 wt %, SAN 1 wt %, talc 10 wt % and resin 7 wt % (the remainder being the activated carbon powder) into 100/17 a honeycomb structure.

EXAMPLE 4

Composition 1. In a first technique, an activated carbon powder was obtained as follows. Phenolic resin (39.5 wt %), charcoal (37.5 wt %), sulfur (7.1 wt %), $MnO_2$ (7.1 wt %), Methocel A4M (5.6 wt %), oil (2.5 wt %), and SAN (1 wt %) were mixed. The mixture was then cured at 150° C., ground to powder, and then carbonized in nitrogen at 800° C. and activated in $CO_2$ at 850° C. to obtain carbon powder containing sulfur and metallic catalyst and a surface area of ~850 $m^2/g$.

Composition 2. In a second technique, an activated carbon powder was obtained by mixing 45 wt % phenolic resin, 40 wt % charcoal, 7.5 wt % sulfur and 7.5 wt % $MnO_2$, curing the mixture, grinding the mixture to a fine powder, and activating to obtain powder with a surface area of 900 $m^2/g$.

Composition 3. In a third technique, an activated carbon powder 85 wt % phenolic resin, 7.5 wt % sulfur and 7.5 wt % $MnO_2$ were mixed and treated as described above in the second technique to obtain high surface area carbon powder with sulfur and metallic catalyst.

The three powders described above can be extruded into a honeycomb shape. Bentonite clay at 15 wt %, Methocel at 7 wt %, SAN at 1 wt % and 77 wt % of Composition 1 were mixed with water to make an extrudable paste. The mixture was extruded into a honeycomb shape and dried at 120° C. The honeycombs thus obtained were strong. Some of the honeycombs were heat treated at 800-900° C. in nitrogen. These honeycombs also were strong. Methocel was removed due to the high temperature heat treatment.

In another instance, bentonite clay at 15 wt %, SAN at 1 wt %, cellulose fiber at 7 wt %, Methocel at 7% and Composition 1 at 70 wt % were mixed, water added to make an extrudable batch and the mixture was extruded into a carbon honeycomb with excellent extrusions and good quality honeycombs after drying and heat treatment.

It should be understood that while the invention has been described in detail with respect to certain illustrative embodiments thereof, it should not be considered limited to such, as numerous modifications are possible without departing from the broad spirit and scope of the invention as defined in the appended claims.

We claim:

1. A process of making a sorbent body, which comprises:
providing a first mixture comprising:
a carbon source,
sulfur, in any oxidation state, as elemental sulfur or in a chemical compound or moiety comprising sulfur,
a metal catalyst, in any oxidation state, as elemental metal or in a chemical compound or moiety comprising the metal, and
carbonizing the first mixture under conditions sufficient to carbonize the carbon source;
activating the carbonized mixture;
mixing the activated first mixture, in the form of particles, with a binder to form a second mixture; and
forming the second mixture into the shape of a sorbent body.

2. A process according to claim 1, which comprises forming the second mixture into the shape of a sorbent body by extrusion.

3. A process according to claim 1, wherein the carbon source is an organic resin.

4. A process according to claim 1, wherein the binder comprises an organic resin, and which comprises curing the organic resin after forming the second mixture into the shape of a sorbent body.

5. The process according to claim 1, wherein the metal catalyst comprises an alkali or alkaline earth metal, a transition metal, a rare earth metal, or a combination thereof.

6. The process according to claim 1, wherein at least a portion of the metal catalyst is chemically bound to at least a portion of the sulfur.

7. The process according to claim 6, which comprises a metal sulfide.

8. The process according to claim 7, wherein the metal sulfide is a sulfide of manganese, copper, calcium, palladium, molybdenum, or tungsten.

9. The process according to claim 7, which further comprises sulfur in addition to that present in the metal sulfide.

10. The process according to claim 9, wherein the sorbent comprises elemental sulfur.

11. The process according to claim 1, wherein at least a portion of the sulfur is chemically bound to at least a portion of carbon in the activated carbon particles.

12. The process according to claim 1, wherein at least a portion of sulfur is not bound to metal catalyst and/or at least a portion of metal catalyst is not bound to sulfur.

13. The process according to claim 1, wherein the discontinuous binder comprises an inorganic binder.

14. The process according to claim 13, wherein the inorganic binder comprises talc or clay.

15. The process according to claim 1, wherein the discontinuous binder comprises an organic binder.

16. The process according to claim 15, wherein the organic binder comprises an organic resin.

17. The process according to claim 1, wherein the discontinuous binder comprises an inorganic binder and an organic binder.

18. The process according to claim 1, wherein the sorbent body is in the form of a monolith.

19. A process according to claim 1, which further comprises firing the shaped sorbent body.

20. A sorbent The process according to claim 1, wherein the sorbent body has a honeycomb structure.

21. The process of claim 1 wherein the binder is in particle form.

22. The process according to claim 1 wherein the sulfur and metal catalyst are distributed homogenously throughout the activated carbon particles.

* * * * *